US009686451B2

(12) United States Patent
Pillai et al.

(10) Patent No.: US 9,686,451 B2
(45) Date of Patent: Jun. 20, 2017

(54) REAL TIME DRIVING DIFFICULTY CATEGORIZATION

(71) Applicant: TOYOTA JIDOSHA KABUSHIKI KAISHA, Toyota-shi, Aichi-ken (JP)

(72) Inventors: Preeti Jayagopi Pillai, Santa Clara, CA (US); Veeraganesh Yalla, Sunnyvale, CA (US); Kentaro Oguchi, Menlo Park, CA (US); Hirokazu Nomoto, Aichi-ken (JP)

( * ) Notice: Subject to any disclaimer, the term of this patent is extended or adjusted under 35 U.S.C. 154(b) by 0 days.

(21) Appl. No.: 14/602,214

(22) Filed: Jan. 21, 2015

(65) Prior Publication Data

US 2016/0207458 A1    Jul. 21, 2016

(51) Int. Cl.
*G06K 9/00* (2006.01)
*H04N 5/225* (2006.01)
*G06K 9/46* (2006.01)

(52) U.S. Cl.
CPC ......... *H04N 5/225* (2013.01); *G06K 9/00791* (2013.01); *G06K 9/46* (2013.01); *G06T 2207/10016* (2013.01)

(58) Field of Classification Search
CPC .......... G06K 9/00791; G06K 9/46; G06T 2207/10016; G06T 7/0081; H04N 5/225; B60R 1/00; B60R 2300/307; B60R 2300/60
See application file for complete search history.

(56) References Cited

U.S. PATENT DOCUMENTS

| 6,640,183 | B2 | 10/2003 | Nordsiek |
| 7,724,962 | B2 | 5/2010 | Zhu et al. |
| 8,238,671 | B1 | 8/2012 | Babenko et al. |
| 8,531,312 | B2* | 9/2013 | Gueziec ............ G01C 21/3492 340/905 |
| 8,718,910 | B2* | 5/2014 | Gueziec ............... G08G 1/0112 701/119 |
| 8,725,396 | B2* | 5/2014 | Gueziec ............... G08G 1/0112 701/117 |

(Continued)

OTHER PUBLICATIONS

Oliva et al., "Modeling the Shape of the Scene: A Holistic Representation of the Spatial Envelope", International Journal of Computer Vision, vol. 42(3): 2001, pp. 145-175.

*Primary Examiner* — Tom Y Lu
(74) *Attorney, Agent, or Firm* — Burbage Law, P.C.; Jon-Michael Burbage; Elizabeth Ruzich

(57) ABSTRACT

The disclosure includes a system and method for determine a real time driving difficulty category. The method may include determining image feature vector data based on one or more features depicted in a real time image of a road scene. The image feature vector data may describe an image feature vector for an edited version of the real time image. The method may include determining offline road map data for the road scene, which includes a static label for a road included in the road scene and offline road information describing a regulatory speed limit for the road. The method may include selecting, based on the static label, a classifier for analyzing the image feature vector. The method may include executing the selected classifier to determine a real time driving difficulty category describing the difficulty for a user of the client device to drive in the road scene.

18 Claims, 7 Drawing Sheets

(56) References Cited

U.S. PATENT DOCUMENTS

| | | | |
|---|---|---|---|
| 8,982,116 B2* | 3/2015 | Gueziec | G01C 21/3694 345/173 |
| 2003/0025597 A1* | 2/2003 | Schofield | B60Q 1/346 340/435 |
| 2012/0158275 A1* | 6/2012 | Huang | G08G 1/0133 701/119 |
| 2013/0079990 A1 | 3/2013 | Fritsch et al. | |
| 2015/0369617 A1* | 12/2015 | Ding | G01C 21/34 701/428 |

* cited by examiner

REAL TIME DRIVING DIFFICULTY CATEGORIZATION

BACKGROUND

The specification relates to real time driving difficulty categorization. The specification may relate to real time driving difficulty categorization for an onboard vision system.

Road driving conditions are dynamic in nature. For example, a roadway may have favorable driving conditions at 2:00 PM and then have less favorable driving conditions as the local time approaches rush hour.

In contrast to road driving conditions, road categorization is static in nature. Each jurisdiction has its own set of hierarchical road classification systems. These systems may classify different roads based the regulatory speed limits and their purpose in traffic engineering. We use this prior road information from the map database, For example, the United States Department of Transportation Federal Highway Administration proposes a functional classification system that categorizes all roads in the United States into three main categories: (1) arterial; (2) collector; and (3) local. An additional category may include a controlled access road. An example a controlled access road is a freeway or interstate. Controlled access roads generally have the highest regulatory speeds. Another category may include a single lane highway. A single lane highway may include a road with relatively high regulatory speeds (though generally not as high as a controlled access road) and no physical boundary between opposing lanes of traffic.

An arterial road includes a high-capacity urban road whose design purpose in traffic engineering includes delivering traffic from a collector road to a controlled access road such as a freeway. Arterial roads may also receive traffic from the controlled access roads and deliver the traffic to a collector road. Arterial roads generally have a higher regulator speed limit than collector roads or local roads.

A collector road includes a low-to-moderate capacity road whose design purpose in traffic engineering includes moving traffic between arterial roads and local roads. Unlike arterial roads, collector roads may be configured to deliver traffic to residential properties. A collector road generally has a lower regulatory speed limit than an arterial road, but a higher regulator speed limit than a local road.

A local road is a low capacity road whose design purpose in traffic engineering is to delivery traffic to residential properties. Local roads generally have lower regulatory speed limits than arterial roads and collector roads.

SUMMARY

According to one innovative aspect of the subject matter described in this disclosure, a road driving difficulty categorization method may include determining image feature vector data based on one or more features depicted in a real time image of a road scene. The road scene may include a road or a road segment. A road segment may be a portion of a road depicted in the real time image. The real time image data may be captured by an onboard image system of a client device. The client device may be a vehicle, robot or any other client device. The image feature vector data may describe an image feature vector for a version of the real time image which has been edited to exclude one or more extraneous features included in the real time image. The method may include determining offline road map data for the road scene, which includes a static label for a road included in the road scene and offline road information describing a regulatory speed limit for the road. The method may include selecting, based on the static label, a classifier for analyzing the image feature vector. The selected classifier may be previously trained offline using human categorized images depicting different road scenes. The method may include executing the selected classifier to determine a real time driving difficulty category describing the difficulty for a user of the client device to drive in the road scene.

In some implementations, the selected classifier may have two or more candidate real time driving difficulty categories to select from when determining the real time driving difficulty category for the current road scene. The method may include determining a set of probability values. Each probability value included in the set may be associated with one of the candidate real time driving difficulty categories. The different probability values may describe a confidence that the different candidate real time driving difficulty categories should be determined to match the road scene depicted in the real time image and associated with the image feature vector. The method may include determining that the candidate driving difficulty category having the highest probability value is the real time driving difficulty category for the road scene.

The selection of the real time driving difficulty categories may be further improved by analysis of real time secondary factors including: the current speed of the mobile device; the current speed of neighboring client devices; the current acceleration of the mobile device; the current acceleration of neighboring client devices; the number of lanes included in the road scene; and the degree of traffic congestion for the road scene.

In some implementations, a series of adjacent image frames may be used instead of a single image. The method may include applying temporal smoothing to obtain a more constant driving difficulty category for a driving time sequence.

Other aspects may include corresponding methods, systems, apparatus, and computer program products.

The subject matter of this disclosure may be described from the viewpoint of various entities. For example, the subject matter may be described from the viewpoint of a client or a server. The server may include various entities. For example, in some implementations the client may include one or more of the following: a vehicle; and a mobile client device.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
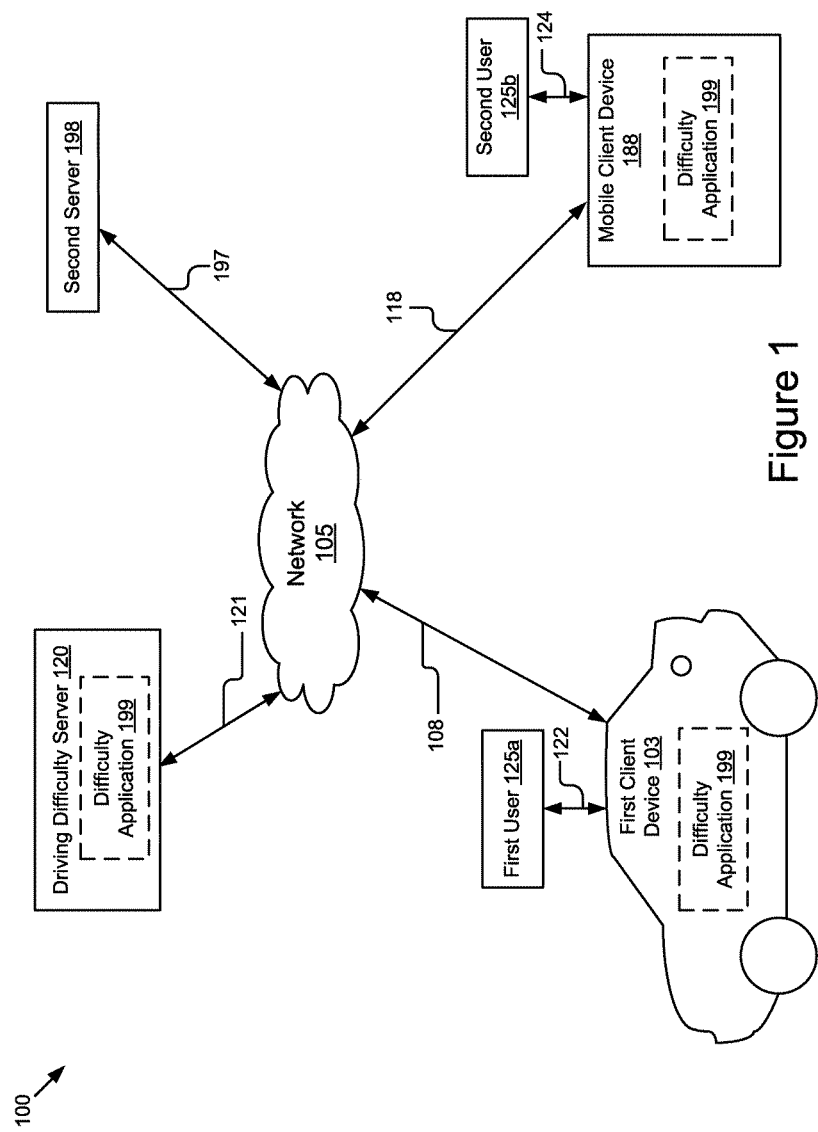
FIG. 1 is a block diagram illustrating an example operating environment for a road driving difficulty categorization system.

The classification of a road as controlled access, highway, arterial, collector or local is static in nature. For example, an arterial road built in 1990 will generally remain an arterial road during its entire useful life. Accordingly, a road in a jurisdiction may include one or more of the following static labels: controlled access road; highway; arterial road; collector road; and local road. These static labels may also be applied to a road segment. A road or a road segment may be described herein collectively or individually as "a road" or "the road."

Although the classification of a road as arterial, collector or local may provide some information about the purpose and regulatory speed limit of the road, this classification is unable to provide real time, dynamic information about the current driving difficulty of a road. For example, since arterial roads generally have high regulatory speed limits and a higher lane count, one might expect the driving difficulty of an arterial road to be generally good because of its classification as "arterial." However, if a freeway which is fed by the arterial road has a traffic accident near the entrance ramp of the arterial road and this traffic accident occurs near rush hour, then the arterial road itself may have increased driving difficulty versus other roads. Three hours later rush hour may pass and the wreckage associated with the traffic accident may be removed from the road, thereby resulting in the arterial road having less driving difficulty when compared to the other roads which had preferable driving difficulty when compared to the arterial road three hours earlier. In this example the driving difficulty of the road changes over the period of three hours. However, in real life scenarios the driving difficulty of a road may change in minutes or even seconds.

Accordingly, existing road categorization systems are unable to provide dynamic information which may consistently and reliably describe the real time driving difficulty of a road. By contrast, the road driving difficulty categorization system described herein provides dynamic information which may consistently and reliably describe the real time driving difficulty of a road based on real time data such as images.

The road driving difficulty categorization system described herein provides other advantages and improvements. For example, the road driving difficulty categorization system may include an onboard two dimensional image system that is configured to categorize a given road scene image into one of five different driving difficulty levels. The road driving difficulty categorization system may categorize the given road scene image at any time of day or night.

In some implementations, the road driving difficulty categorization system is configured to improve the process of a computer system by eliminating the need for complex, low-level processing of pixel-by-pixel image detail. The road driving difficulty categorization system may be configured to run in provide output in real time, without use of expensive imaging hardware.

In some implementations, the road driving difficulty categorization system may be configured to operate on a vehicle, mobile client or any other client device. For implementations where the road driving difficulty categorization system is deployed as an element of a vehicle, the road driving difficulty categorization system may function and provide accurate results regardless of how the onboard imaging system is mounted to the vehicle. For example, the road driving difficulty categorization system may function and provide accurate results whether the onboard imaging system is mounted: inside the vehicle; outside the vehicle; frontward facing on the vehicle; or rearward facing on the vehicle.

In some implementations, the road driving difficulty categorization system is configured to consider the actual road hierarchy for a given jurisdiction when determining its output. In this way, the road driving difficulty categorization system may be configured tout provide more true-to-life driving difficulty categorization for a given road scene image.

In some implementations, the methodology of the road driving difficulty categorization system may be configured to overcome drawbacks of using two-dimensional vision sensors in the onboard image system such as blurring, low resolution, artifacts, etc. In this way, the road driving difficulty categorization system may provide a real-time working solution to analyze the driving difficulty of a road scene image without the need for low-level computing and analysis of the road scene image on a pixel-by-pixel or bit-by-bit basis.

FIG. 1 is a block diagram illustrating an example operating environment for a road driving difficulty categorization system 100, according to some implementations. The system 100 includes a first client device 103, a mobile client device 188, a driving difficulty server 120 and a second server 198. The first client device 103 and the mobile client device 188 may be accessed by users 125a and 125b (also referred to herein individually and collectively as "user 125"), via signal lines 122 and 124, respectively. In the illustrated example, these entities of the system 100 may be communicatively coupled via a network 105.

The first client device 103 and the mobile client device 188 in FIG. 1 may be used by way of example. While FIG. 1 illustrates two client devices 103 and 188, the disclosure applies to a system architecture having one or more client devices 103, 188. Furthermore, although FIG. 1 illustrates one network 105 coupled to the first client device 103, the mobile client device 188, the endpoint 101, and the second server 198, in practice one or more networks 105 may be connected. While FIG. 1 includes one driving difficulty server 120 and one second server 198, the system 100 could include one or more management servers 120 and one or more second servers 198.

The network 105 may include a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may include a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. In some implementations, the network 105 may include a global positioning system (GPS) satellite for providing GPS navigation to the first client device 103 or the mobile client device 188. In some implementations, the network 105 may include a GPS satellite for providing GPS navigation to the first client device 103 or the mobile client device 188. The network 105 may include a mobile data network for example, 3G, 4G, long-term evolution (LTE), Voice-over-LTE ("VoLTE"), or other mobile data network or combination of mobile data networks.

In some implementations, the difficulty application 199 may be operable on the first client device 103. The first client device 103 may include a mobile device. For example, the first client device 103 may include one of a vehicle (e.g., an automobile, a bus, an airplane, a boat), an autonomous or semi-autonomous vehicle, a robot, or other mobile system including non-transitory computer electronics. The vehicle may be an electric vehicle, a hybrid vehicle, or a vehicle that includes an internal combustion engine. In some implementations, the first client device 103 may include a computing device that includes a memory and a processor. The processor may be programmed to perform one or more blocks of the methods 400, 500 described below with reference to FIGS. 4 and 5. In the illustrated example, the first client device 103 is communicatively coupled to the network 105 via signal line 108.

In some implementations, a difficulty application 199 may be operable on the mobile client device 188. The mobile client device 188 may include a portable computing device that includes a memory and a processor, for example, a removable in-dash device, a smartphone, an Internet-of-Things device (an IoT device such as a smartwatch, a fitness tracker, a wearable device, etc.) a tablet computer, a personal computer, a laptop, a personal digital assistant (PDA), a mobile telephone, a mobile e-mail device, a portable game player, a portable music player, or any other portable electronic device capable of accessing the network 105. In some implementations, the difficulty application 199 may act in part as a thin-client application that may be stored on the first client device 103 and in part as components that may be stored on the mobile client device 188. In the illustrated example, the mobile client device 188 is communicatively coupled to the network 105 via signal line 118.

In some implementations, the first user 125*a* and the second user 125*b* may be the same user 125 interacting with both the first client device 103 and the mobile client device 188. For example, the user 125 may be a driver sitting in the first client device 103 (e.g., a vehicle) and operating the mobile client device 188 (e.g., a smartwatch). In some other implementations, the first user 125*a* and the second user 125*b* may be different users 125 that interact with the first client device 103 and the mobile client device 188, respectively. For example, the first user 125*a* could be a driver that drives the first client device 103 and the second user 125*b* could be a passenger that interacts with the mobile client device 188.

The difficulty application 199 may be code and routines for determining a road driving difficulty categorization for a real time image. The image may depict a road scene. The difficulty application 199 may determine the road driving difficulty category for the image in real time. In some implementations, the difficulty application 199 is programmed to perform one or more blocks of the methods 400, 500 described below with reference to FIGS. 4 and 5.

The difficulty application 199 may include functionality for capturing real time image data describing a real time image of a current road scene. The real time image data may be captured by an onboard image system of a client device 103, 188.

The difficulty application 199 may include functionality for processing the real time image. For example, the difficulty application 199 may include functionality for selecting a region of interest for the real time image of the road scene. The difficulty application 199 may include functionality for generating a dense grid sampling for the region of interest for the real time image of the road scene. The difficulty application 199 may include functionality for determining an image feature vector based on the dense grid sampling for the region of interest for the real time image of the road scene.

The difficulty application 199 may include functionality for determining a geographic location of the client device 103, 188. The geographic location of the client device 103, 188 may be determined based on global positioning system (GPS) coordinates, wireless signal triangulation such as Wi-Fi triangulation, or any other methodology for determining the location or a device communicatively coupled to the network 105. The difficulty application 199 may include functionality for determining road map data based on the geographic location of the client device 103, 188. The road map data may describe a road associated with the geographic location of the client device. The difficulty application 199 may include functionality for selecting a classifier from a set of classifiers based on one or more of the following: (1) the geographic location of the client device 103, 188; (2) offline road map data; and (3) runtime road description data. The classifier selected from the set of classifiers may be referred to as the "selected classifier."

The selected classifier may be previously trained offline using human categorized images depicting different road scenes. The difficulty application 199 may include functionality for providing the image feature vector to the selected classifier. The difficulty application 199 may include functionality for executing the selected classifier using the image feature vector as an input for the selected classifier. The selected classifier may be configured to determine a real time driving difficulty category for the current road scene associated with the image feature vector inputted to the selected classifier.

In some implementations, the selected classifier may have two or more candidate real time driving difficulty categories to select from when determining the real time driving difficulty category for the current road scene. The difficulty application 199 may include functionality for determining a set of probability values. Each probability value included in the set may be associated with one of the candidate real time driving difficulty categories. The different probability values may describe a confidence that the different candidate real time driving difficulty categories should be determined by the difficulty application 199 to match the current road scene associated with the image feature vector. The difficulty application 199 may include functionality for determining that the candidate driving difficulty category having the highest probability value is the real time driving difficulty category for the current road scene associated with the image feature vector inputted to the selected classifier.

The selection of the real time driving difficulty category may be further improved by analysis of real time secondary factors including: the current speed of the mobile device; the current speed of neighboring client devices; the current acceleration of the mobile device; the current acceleration of neighboring client devices; the number of lanes included in the road; and the degree of traffic congestion for the road. The difficulty application 199 may include functionality for providing the analysis of the secondary factors and improving the selection of the real time driving difficulty category.

In some implementations, a series of adjacent image frames may be used instead of a single image. The difficulty application 199 may include functionality for applying temporal smoothing to obtain a more constant driving difficulty category for a driving time sequence.

In some implementations, the difficulty application 199 may be implemented using hardware including a field-programmable gate array ("FPGA") or an application-specific integrated circuit ("ASIC"). In some other implementations, the difficulty application 199 may be implemented using a combination of hardware and software. The difficulty application 199 may be stored in a combination of the devices and servers, or in one of the devices or servers. The difficulty application 199 may include code and routines configured to perform one or more blocks of the methods 400, 500 of FIGS. 4 and 5 when executed by a processor, such as processor 225, described below with reference to FIG. 2.

In some implementations, the difficulty application 199 may be operable on one or more of the driving difficulty server 120, the first client device 103 and the mobile client device 188. For example, a first difficulty application 199 may be implemented on the driving difficulty server 120 while a second difficulty application 199 is implemented on the first client device 103. A third difficulty application 199 may also be implemented on the mobile client device 188. The system 100 may include one or more of the first, second and third difficulty applications 199. For example, the system 100 may include any combination of the first difficulty application 199, the second difficulty application 199 and the third difficulty application 199. In some implementations, the first difficulty application 199 implemented on the driving difficulty server 199 may provide some of the functionality described above for the difficulty application 199, while the second or third difficulty applications 199 may provide other aspects of the functionality of the difficulty application 199.

The driving difficulty server 120 may include a hardware server that includes a processor, a memory, and network communication capabilities. In the illustrated example, the driving difficulty server 120 is coupled to the network 105 via signal line 121. The driving difficulty server 120 sends and receives data to and from other entities of the system 100 via the network 105. The driving difficulty server 120 may include one or more application programming interfaces for interacting with one or more network services.

The second server 198 may include a server that provides data to the first client device 103, the mobile client device 188, the driving difficulty server 120 or the difficulty application 199. The second server 198 may including functionality for providing network services for the entities of the system 100. For example, the second server 198 may include an infotainment server for providing infotainment, a music server for providing streaming music services, a social network server for providing social network data, a traffic server for providing traffic data, a map server for providing map data, a weather server for providing weather data, a power service server for providing power usage service (e.g., billing service), or a health server for providing health information. The second server 198 is coupled to the network 105 via signal line 197.

The second server 198 may host and/or generate websites that provide one or more of the following network services: navigation instructions; streaming audio or video (for example, Pandora™, Spotify™, iTunes™, Google Play™, YouTube™, Netflix™, Hulu Plus™, Crackle™, Amazon™ Instant Video, Prime Instant Video, Digital Music Store, Prime Music App Store, etc.); microblogging (for example, Twitter™, Tumblr™, etc.); online social networking (for example, Facebook™, Google+™, LinkedIn™, Tinder™, or QQ™, etc.); online chatting (for example, Google Chat™, Snapchat™, WhatsApp™, etc.); online content sharing (for example, Instagram™, Pinterest™, etc.); e-mail (for example, Gmail™, Outlook™, Yahoo! Mail™, etc.); file sharing (for example, Dropbox™, Google Drive™, MS OneDrive™, Evernote™, etc.); electronic calendar and scheduling (for example, Google™ Calendar, MS Outlook™, etc.); and health data sharing (for example, Fitbit™, Jawbone™, Nike+ Fuelband, etc.). In some implementations, a user may consume one or more of these network services via an infotainment system of the vehicle.

Example Monitoring Application

Figure 2:
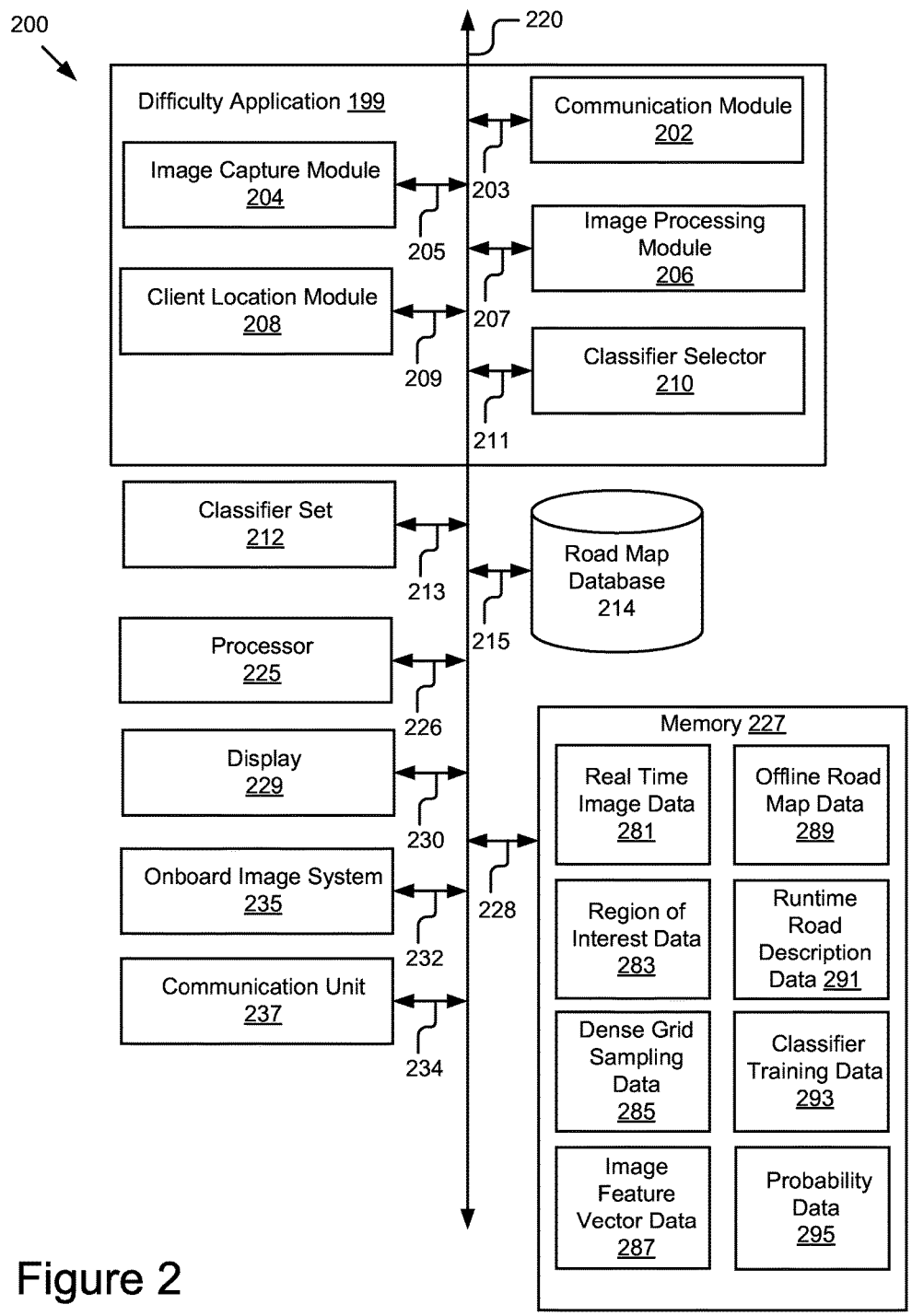
FIG. 2 is a block diagram illustrating an example road driving difficulty categorization system.

FIG. 2 is a block diagram illustrating an example road driving difficulty categorization system 200. The system 200 may be, or include, or be included in the first client device 103, the mobile client device 188 or the driving difficulty server 120 of FIG. 1. In some implementations, the system 200 may include a special-purpose computing device configured to provide some or all of the functionality described below with reference to FIG. 2-6.

FIG. 2 may include the difficulty application 199, a classifier set 212, a processor 225, a memory 227, a display 229, an onboard image system 235, and a communication unit 237. The components of the system 200 are communicatively coupled by a bus 220.

The classifier set 212 one or more classifiers. The classifiers included in the classifier set 212 may include code and routines configured to determine a road driving difficulty category for a real time image. The real time image may depict a road scene. The classifier selector 210 of the difficulty application 199 may include code and routines configured to select a classifier from the classifier set 212 based on analysis of the real time image. The classifier selected by the classifier selector 210 may be referred to herein as the selected classifier.

The classifiers included in the classifier set 212 may be configured to determine the road driving difficulty category for the real time image based on a one or more real time factors. The real time factors may include one or more of the following: the amount of drivable area on the roadway; the time of day; the surrounding vehicular traffic; the surrounding pedestrian traffic. The classifiers may be configured to assign the road depicted in the real time image to one of five different road driving difficult categories. The road driving difficulty categories may include the following: A; B; C; D; and E.

The road driving difficulty categories may indicate the driving difficulty of a road. The road driving difficult categories may be ranked from least difficult to most difficult. Roads assigned to the "A" category may be the least difficult for a driver whereas roads assigned to the "E" category may be the most difficult for drivers. Accordingly, a category "E" road may be more difficult to drive than a category "D" road, a category "C" road, a category "B" road and a category "A" road. A category "D" road may be less difficult to drive than a category "E" road, but more difficult to drive than a category "C" road, a category "B" road and a category "A" road. A category "C" road may be less difficult to drive than a category "E" road and a category "D" road, but more difficult to drive than a category "B" road and a category "A" road. A category "B" road may be less difficult to drive than a category "E" road, a category "D" road and a category "C" road, but more difficult to drive than a category "A" road. A category "A" road may be less difficult to drive than a category "E" road, a category "D" road, a category "C" road, a category "B" road and a category "A" road.

The classification of a road as a controlled access road, highway, arterial road, collector road or local road is static in nature. For example, an arterial road built in 1990 will generally remain an arterial road during its entire useful life. Accordingly, a road a jurisdiction may include one or more of the following static labels: controlled access road; highway; arterial road; collector road; and local road.

A road map database 214 may include static labels and offline road information for each road in a jurisdiction. The static labels included in the road map database 214 may be determined for one or more roads. Each road may be associated with a geographic location. The static labels may be determined for the roads during an offline process. The offline road information may describe descriptive information for the road. For example, the offline road information may describe the number of lanes, regulatory speed, and traffic survey information for the road. However, in some implementations the offline road information in the road map database 214 may be outdated or inaccurate due to human error or traffic engineers or engineers in training who may have populated the road map database 214.

The classifiers included in the classifier set 212 may include code and routines configured to determine the real time driving difficulty category for the real time image based in part on one or more of the following: the real time image data 281; the region of interest data 283; the dense grid sampling data 285; the image feature vector data 287; the offline road map data 289; the runtime road description data 291; the classifier training data 293; and the probability data 295. For example, the client location module 208 of the difficulty application 199 may determine the geographic location of a client device. Data describing the geographic location may be used to query the road map database 214 and retrieve, among other things, the static label for the road associated with the geographic location for the client device. The classifier selector 210 may select a classifier from the classifier set 212 based on the static label for the road. The classifier selected by the classifier selector 210 may be referred to as the "selected classifier."

In this way the classifier selector 210 may treat the static label as a prior when determining the real time driving difficulty category for a road depicted in a real time image since the static label is used by the classifier selector 210 when selecting the classifier from the classifier set 212. However, since offline data such as the static label may be inconsistent with real time conditions (or inaccurate due to being outdated or human error), the selected classifier may provide further analysis at run time of a real time image of the road and other information in order to accurately categorize the driving difficulty of the road. In this way the selected classifier may determine a real time driving difficulty category that more accurately describes the difficulty of a road a run time under dynamic real time conditions. For example, the selected classifier may determine the real time driving difficulty category for a road depicted in a real time image based on one or more of the following: the real time image data 281; the region of interest data 283; the dense grid sampling data 285; the image feature vector data 287; the offline road map data 289; the runtime road description data 291; and the probability data 295.

A classifier may include a discriminative classifier. For example, the classifier may include a support vector machine (SVM) which is trained and custom coded for the system 200. The classifier may be trained in an offline process using classifier training data 293. The classifier training data 293 may include data describing one or more annotated images. For example, the classifier training data 293 may include one thousand annotated images. The annotated images may be selected and annotated by a human in an offline process. The annotated images may include different driving segments of roads at different times of the day (for example, to account for different traffic or lighting conditions). The annotated images may be labeled into one of the five driving difficulty categories described above ("A" though "E"). In an offline process separate from the real time analysis of the real time images, the human may manually annotate each of the images and subjectively select one of the driving difficulty categories to apply to the images as static labels for the images.

The manual annotation of the images may include the human subjectively assigning each of the images to one or the driving difficulty categories. This subjective assignment may be referred to as the "annotated dynamic label." The annotated dynamic label may be associated with the image. Each image may also have a pre-assigned "static label." The static label may be automatically assigned by the system 200. The pre-assigned static label may be based on the static labels and the offline road information for the road depicted in the image as described by the road map database 214. For example, an arterial road having four lanes of traffic and a regulatory speed limit of fifty-five miles per hour may be preassigned a static label of "C." Accordingly, each image described by the classifier training data 293 may have an annotated dynamic label and a pre-assigned static label. The classifier training data 293 may include the labeled images. The labeled images may be configured so that the classifier training data 293 includes a statistically significant number of images from each of the categories, "A" through "E." For example, the classifier training data 293 may include two hundred images from each category. In this way the classifiers may be trained to identify real time images belonging to each category.

The annotated dynamic label and a pre-assigned static label for an image may be the same or different. For example, the annotated dynamic label may be "C" for a road and the preassigned static label for the road may be "B." This difference may indicate that a human would view the road depicted in the image as a category "C" road even though the preassigned static label is "B." In this way the differences in the labels may beneficially improve the classification of road in a dynamic run time process. The classifier training data 293 may be trained using the classifier training data 293.

Figure 3A:
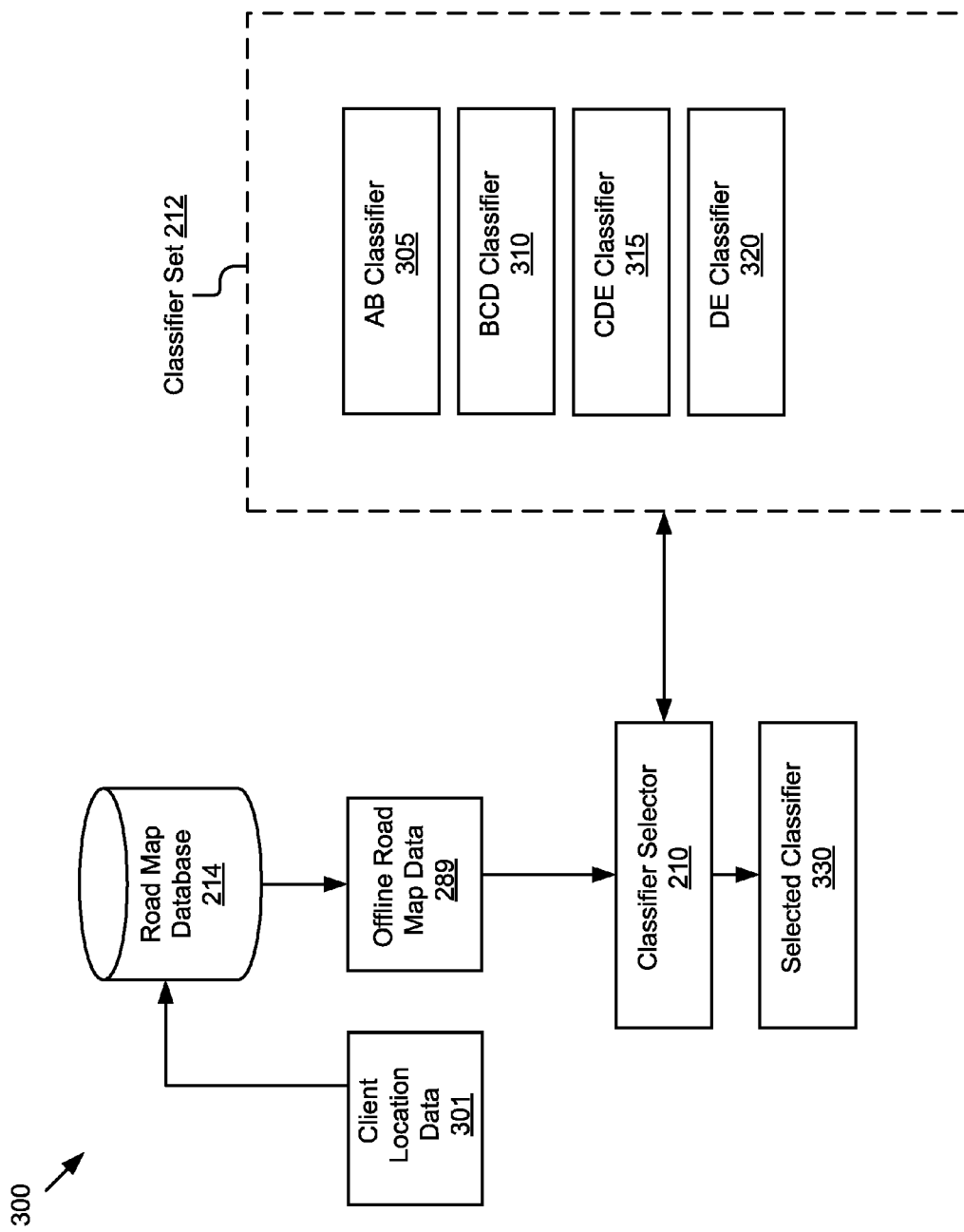
FIG. 3A is a block diagram illustrating a process flow for configuring a classifier selector.
Figure 3B:
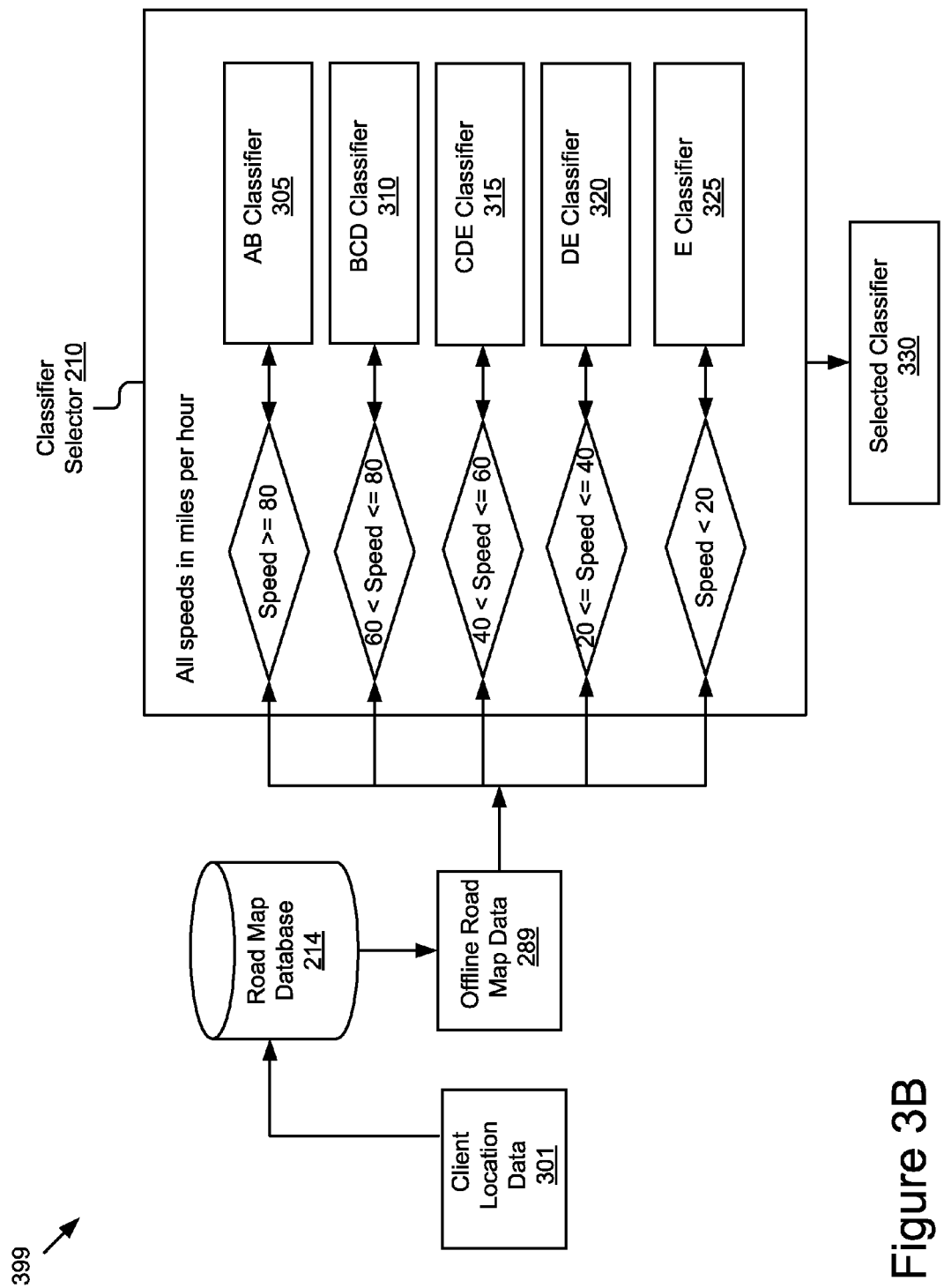
FIG. 3B is a block diagram illustrating a process flow for selecting a selected classifier.

An example of the classifiers included in the set 212 is depicted in FIGS. 3A and 3B. In these depicted examples the classifiers are configured so that no single classifier may classify a real time image as any the five categories. For example, the classifier set 212 does not include an "ABCDE" classifier since experimentation has shown that using such classifiers results in false positives. For example, assume that a real time image of a road scene is associated with the following labels: (1) the annotated dynamic label is category "B"; and (2) pre-assigned static label is category "A. The road scene in the real time image may be categorized as "A" or "B." In other words, the road scene image indicates a road that is difficult to drive. Our experiments have shown that such a road is best classified using an "AB" classifier rather than an "ABCDE" classifier since using an "ABCDE" classifier poses the risk that the road may be classified as D or E, which is not likely to be accurate based on the combination of the annotated dynamic label and the pre-assigned static label for this real time image. In other words, using an "ABCDE" classifier for this real time image poses a risk of a false positive that may yield a deleterious result, whereas using an "AB" classifier for this real time image will result is a usable result even if a false positive does occur.

Accordingly, in some implementations the classifiers included in the classifier set 212 are trained using one or more of the following discriminative classifiers: (1) an AB classifier; (2) an BCD classifier; (3) an CDE classifier; and (4) an DE classifier. Examples of these classifiers are depicted in FIGS. 3A and 3B, according to some implementations (see, for example, elements 305, 310, 315 and 320 of FIGS. 3A and 3B). In some implementations, a fifth classifier may be included in the classifier set 212: "E." An example of the "E" classifier is depicted in FIG. 3B, according to some implementations (see, for example, element 325 of FIG. 3B). Each of these classifiers may be trained using the classifier training data 293. The classifier set 212 will be described in more detail below with reference to FIGS. 3A-6.

The classifier set 212 is coupled to the bus 220 via signal line 213. The road map database 214 is coupled to the bus 220 via signal line 215. In some implementations, one or more of the classifier set 212 and the road map database 214 is stored on the memory 227.

In some implementations, the road map database 214 is stored and executed by the second server 198 and accessed by the communication unit 237. For example, the road map database 214 may include a service such as Google Maps™, Nokia HERE™ or any other map service or combination of map services that may provide the offline road map data 289. The road map database 214 may include a geographic information system (GIS). The road map database 214 may include the HERE API and be configured to retrieve offline road information using the HERE API. The road map database 214 may be configured to include incremental updates. In some implementations, the road map database 214 is provided by a government agency.

The processor 225 may include an arithmetic logic unit, a microprocessor, a general-purpose controller, or some other processor array to perform computations and provide electronic display signals to a display device. The processor 225 may include a graphics processing unit (GPU). The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible. In some implementations, the processor 225 may be programmed to perform one or more blocks of the methods 400, 500 described below with reference to FIGS. 4 and 5. For example, the processor 225 may be a special purpose processor programmed to perform one or more blocks of the methods 400, 500 described below with reference to FIGS. 4 and 5. The processor 225 is coupled to the bus 220 for communication with the other components via signal line 226.

The memory 227 may store instructions or data that may be executed by the processor 225. The memory 227 may be a non-transitory computer-readable storage medium. The instructions or data stored on the memory 227 may include code for performing the techniques described herein. The memory 227 may be tangible. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 228.

As illustrated in FIG. 2, the memory 227 stores one or more of the following elements: real time image data 281; region of interest data 283; dense grid sampling data 285; image feature vector data 287; offline road map data 289; runtime road description data 291; classifier training data 293; and probability data 295.

The real time image data 281 may include data describing one or more real time images captured by the onboard image system 235. For example, the real time image data 281 may describe a real time image depicting a road scene. As described below, the image processing module 206 may include code and routines for processing the real time image data 281. The region of interest data 283, dense grid sampling data 285 and image feature vector data 287 may be determined by the image processing module 206 based on processing the real time image data 281 as described below.

The region of interest data 283 may include data describing a region of interest included in a real time image described by the real time image data 281. The region of interest selected by the image processing module 206 may remove information included in the real time image which is determined by the image processing module 206 to be redundant or extraneous. For example, the region of interest data 283 may include data describing a version of the real time image that removes extraneous features included in the real time mage such as the sky and adjacent structural visual information. In some implementations, the region of interest data 283 may be further configured by the image processing module 206 to generate a version of the real time image that is focused towards a central vanishing point of the road included in the real time image.

The dense grid sampling data 285 may include data describing a dense grid sampling generated for the version of the real time image described by the region of interest data 283. In some implementations, the dense grid sampling data 285 may include data describing a dense grid sampling generated for the real time image data 281.

The image feature vector data 287 may include data describing one or more image feature vectors. The image feature vectors may be determined based on one or more of the following: the real time image data 281; the region of interest data 283; and the dense grid sampling data 285.

The offline road map data 289 may describe one or more static labels and offline road information for each road in a jurisdiction. The road map data 289 may be retrieved from the road map database 214. For example, the client location module 208 may determine a geographic location associated with a client device. The client location module 208 may query the road map database 214 using the geographic location for the client device to determine one or more of the following: (1) a road associated with the geographic location; (2) a static label associated with the road; and (3) offline road information associated with the road. In some implementations, the offline road map data 289 may include data which is collected or determined offline. By contrast, the runtime road data 291 may include data which is collected or determined at runtime.

The runtime road description data 291 may include data describing a road based on real time data. For example, the runtime data 291 may include data determined based on one or more of the following: the real time image data 281; the region of interest data 283; the dense grid sampling data 285; the image feature vector data 287. The runtime road description data 291 may describe features of a road scene based on analysis of one or more of the following: (1) a real time image of the road scene captured by the onboard image system 235; and (2) operational data provided by the client itself. For example, the runtime road description data 291 may describe real time secondary factors including: the current speed of the mobile device; the current speed of neighboring client devices; the current acceleration of the mobile device; the current acceleration of neighboring client devices; the number of lanes included in the road scene; and the degree of traffic congestion for the road scene.

The classifier training data 293 may include data used to train the classifiers included in the classifier set 212. The classifier training data 293 was described above with reference to the classifier set 212, and so, that description will not be repeated here.

In some implementations, the classifier training data 293 may be used to train the image processor module 206 to extract features from the real time image data 281. The extracted features may then be used to determine the image feature vector data 287. For example, the image feature module 206 may include code and routines configured to extract one or more visual features from the real time image described by the real time image data 281. The image feature module 206 may be trained using the classifier training data 293. The training of the image feature module 206 may improve the performance of the image feature module 206 in determining which features to extract from the real time image described by the real time image data 281. The image feature module 206 may build the dense grid sampling data 285 using the extracted features, and the dense grid sampling data 285 may be used to determine the image vector data 287 based on the extracted features included in the dense grid sampling data 285. The image feature vector data 287 describing the image feature vector may then be inputted to the classifier selected by the classifier selector 210.

In some implementations, if the classifier selector 210 previously selected a classifier of a particular type ("AB," "BCD," "CDE," "DE," "E") for a real time image at a neighboring geographic location, then the image processing module 206 may extract features for the current real time image that correspond to images of the previous type for the neighboring geographic location since the current real time image may be likely to have the same or similar type. In this way the image processing module 206 is able to customize the features extracted from a real time image based on being trained using the classifier training data 293.

The probability data 295 may include data describing a set of probability values. Each probability value included in the set may be associated with one of the candidate real time driving difficulty categories. The different probability values may describe a confidence that the different candidate real time driving difficulty categories should be determined by the selected classifier (to match the current road scene associated with the image feature vector. The selected classifier may be selected from the set 212 by the classifier selector 210. The selected classifier may analyze one or more candidate real time driving difficulty categories to determine which of these categories should be applied to the road scene image depicted in the real time image. The applied category may be referred to as the "real time driving difficulty category." The selected classifier may include code and routines for determining that the candidate driving difficulty category having the highest probability value is the real time driving difficulty category for the current road scene associated with the image feature vector inputted to the selected classifier.

The display 229 may include hardware for displaying graphical data from the difficulty application 199. For example, the display 229 renders graphics for displaying a user interface that displays a description of the real time driving difficulty category for one or more real time images. The display 229 is coupled to the bus 220 via signal line 230.

The onboard image system 235 may include one or more devices that provide the real time image data 281 to the system. For example, the onboard image system 235 may include one or more cameras mounted to the inside or the outside of the client device. One or more of the cameras included in the onboard image system 235 may include high definition cameras. The onboard image system 235 may be configured so that the real time image data 281 is stored in an uncompressed format. For example, experimentation has shown that compressing the real time image data 281 results in slower than real-time performance of the system 200 since the real time image data 281 must be decompressed if stored in a compressed format.

In some implementations, the cameras included in the onboard image system 235 does not include a stereo depth camera. Experimentation has shown that stereo depth camera has shown that such cameras result in image data that is computationally expensive to analyze, process and determine image feature vector data 287 for features included in the image data.

In some implementations, the onboard image system 235 may be communicatively coupled to an onboard computer of a vehicle. The onboard image system 235 may include may include additional sensors including an infrared detector, an accelerometer, a gyroscope, a motion detector, a thermostat, a microphone, a speaker, etc. For example, the first client device 103 may include sensors for measuring one or more of a current time, a location (e.g., a latitude, longitude, and altitude of a location), an acceleration of a vehicle, a velocity of a vehicle, a fuel tank level of a vehicle, a battery level of a vehicle, etc. Alternatively or additionally, the onboard image system 235 may include a component or module of another system or device (e.g., radio, infotainment system, thermostat) that reports a status of the system or device to the system 200.

In some implementations, the onboard image system 235 includes hardware for performing location detection, for example, a global positioning system (GPS), location detection through triangulation via a wireless network, etc. In some implementations, the client device is a vehicle, and the onboard image system 235 provides information about at least one of a temperature inside the vehicle, a temperature outside the vehicle, a position of the seats, a radio station, an audio program, a window level, a level of illumination of car lights, a speed of windshield wipers, and other settings associated with the vehicle and/or any system, subsystem, or device included in or communicatively coupled to the vehicle.

In some embodiments, the client device is the mobile client device 188, and the onboard image system 235 includes one or more sensors of the mobile client device 188 such as a camera, an accelerometer, a gyroscope, a GPS chip, a graphics processor, etc.

The onboard image system 235 is coupled to the bus 220 via signal line 232.

The communication unit 237 may include hardware that transmits and receives data to and from at least one of the first client device 103 and the mobile client device 188, depending upon where the difficulty application 199 is stored. The communication unit 237 is coupled to the bus 220 via signal line 234. In some implementations, the communication unit 237 includes a port for direct physical connection to the network 105 or to another communication channel. For example, the communication unit 237 includes a USB, SD, CAT-5, or similar port for wired communication with the first client device 103. In some implementations, the communication unit 237 includes a wireless transceiver for exchanging data with the first client device 103 or other communication channels using one or more wireless communication methods, including IEEE 802.11, IEEE 802.16, Bluetooth®, or another suitable wireless communication method.

In some implementations, the communication unit 237 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 237 includes a wired port and a wireless transceiver. The communication unit 237 also provides other conventional connections to the network 105 for distribution of files or media objects using standard network protocols including TCP/IP, HTTP, HTTPS, and SMTP, etc.

In some implementations, the difficulty application 199 includes a communication module 202, an image capture module 204, an image processing module 206, a client location module 208 and a classifier selector 210.

The communication module 202 may include code and routines for handling communications between the difficulty application 199 and other components of the system 200. In some implementations, the communication module 202 may include a set of instructions executable by the processor 225 to provide the functionality described below for handling communications between the difficulty application 199 and other components of the system 200. In some implementations, the communication module 202 may be stored in the memory 227 of the system 200 and may be accessible and executable by the processor 225.

The communication module 202 sends and receives data, via the communication unit 237, to and from one or more of the first client device 103, the mobile client device 188, the driving difficulty server 120 and the second server 198 depending upon where the difficulty application 199 may be stored. For example, the communication module 202 receives, via the communication unit 237, traffic information from the second server 198 indicating the traffic congestion of a road. The communication module 202 sends information about the traffic information to the selected classifier for use when determining the real time driving difficulty category for a real time image of the road scene. The communication module 202 is coupled to the bus 220 via signal line 203.

In some implementations, the communication module 202 receives data from components of the difficulty application 199 and stores the data in the memory 227. For example, the communication module 202 receives data from the onboard image system 235 and stores it as real time image data 281 in the memory 227.

In some implementations, the communication module 202 may handle communications between components of the difficulty application 199. For example, the communication module 202 retrieves the offline road map data 289 from the memory 227 and provides a static label from the offline road map data 289 to the classifier selector 210.

The image capture module 204 may include code and routines for capturing a real time image of a road scene. For example, the image capture module 204 may cause the onboard image system 235 to capture a real time image of a road scene.

The image processing module 206 may include code and routines for processing the real time image data 281. For example, the image processing module 206 may process the real time image data 281 to determine one or more of the following: (1) the region of interest data 283; (2) the dense grid sampling data 285; and the (3) image feature vector data 287.

In some implementations, the image processing module 206 may include code and routines configured to use visual texture features to determine scene context for the road scene depicted by the real time image data 281. The scene context may be described by scene context data stored on the memory 227. The scene context data may beneficially enable the system 200 to determine one or more road scene layout features used by the selected classifier to determine the real time driving difficulty category for the road scene depicted in the real time image data 281. The image processing module 206 may also include code and routines configured to implement one or more other feature extraction methods such as a scale-invariant feature transform (SIFT) and local binary patterns (LBP) descriptions which may be used to determine the scene context data.

As mentioned above, in some implementations the image processing module 206 may include code and routines configured to determine the dense sampling grid data 285. The dense sampling grid data 285 may include a description of one or more features included in the version of the real time image described by the region of interest data 283. The image processing module 206 may use the dense sampling grid data 285 to sequentially extract features from the version of the real time image described by the region of interest data 283. The features may be included in the dense sampling grid data 285. In some implementations, the dense sampling grid data 285 may describe the one or more features extracted from the version of the real time image described by the region of interest data 283. The image processing module 206 may use the features described by the region of interest data 283 to determine one or more image feature vectors for the real time image. The image feature vectors may be described by the image feature vector data 287. Using the region of interest data 283 instead of the real time image data 281 to determine the features used to determine the image feature vectors may beneficially enable the system 200 to determine the image feature vectors in real time since the version of the real time image described by the region of interest data 283 beneficially excludes redundant features of the real time image. In this way, the image processing module 206 may determine one or more image feature vectors in real time.

In some implementations, the image processing module 206 includes code and routines for one or more methods for extracting the features from the real time image and using the features to form the image feature vector data 286. The image processing module 206 may include functionality to select the methodology used to extract the features based on the characteristics of the road as depicted in the real time image data 281 or the region of interest data 283. Accordingly, in some implementations the image processing module 206 includes code and routines configured to analyze the real time image data 281 or the region of interest data 283 and select a feature extraction methodology to be applied which is optimal for the image of the road included in the real time image data 281 or the region of interest data 283.

In some implementations, the methods implemented by the image processing module 206 to extract features from the real time image are independent of determining semantic categories included in the real time image. For example, a method that includes semantic categorization may categorize an entire scene in an image as a single category. Experimentation has shown that approaches that categorize an entire scene or a majority of a scene to a single category do not provide enough information about the real time image to create an image feature vector that is effective at determining a real time driving difficulty category for a road scene included in the real time image. Experimentation has shown that approaches that categorize an entire scene or a majority of a scene to a single category are likely to include false positives or results that may endanger the safety of the user.

In some implementations, the methods implemented by the image processing module 206 are independent of relying on only lighting categorization for an image. Experimentation has shown that approaches that categorize an image or a scene for an image based on only lighting conditions do not provide enough information about the real time image to create an image feature vector that is effective at determining a real time driving difficulty category for a road scene included in the real time image. Experimentation has shown that approaches that categorize an image or a scene for an image based on only lighting conditions are likely to include false positives or results that may endanger the safety of the user.

The location module 208 may include code and routines for determining a current location of a user at a current time. In some implementations, the location module 204 may include a set of instructions executable by the processor 225 to provide the functionality described below for determining the current location of the user at the current time. In some implementations, the location module 208 may be stored in the memory 227 of the system 200 and may be accessible and executable by the processor 225. The location module 208 is coupled to the bus 220 via signal line 209.

In some implementations, the client location module 208 receives client location data from the onboard image system 235 or the communication unit 237 that includes information describing the geographic location of the client device. For example, the client location data may include GPS data that indicates the geographic location of the client device. In some implementations, the client location module 208 may cause the communication unit 237 to retrieve the client location data from the network 105. The client location module 208 may store the client location data on the memory 227 as part of the runtime road description data 291. The client location module 208 may use the client location data to retrieve the offline road map data 289 from the road map database 214. The client location module 208 may cause the communication module 202 to transmit the offline road map data 289 to the classifier selector 210.

The classifier selector 210 may include code and routines selecting a classifier from the classifier set 212. The classifier selector 210 was described above with reference to the classifier set 212, and so that description will not be repeated here. In some implementations, the classifier selector 210 includes code and routines to select a classifier from the set 212 based on the static label for the real time image described by the real time image data 281. For example, the classifier selector 210 may receive the offline road map data 289 for a road associated with the client location data. The classifier selector 210 may determine the static label for the road as indicated by the offline road map data 289 associated with the road. The classifier selector 210 may select one of the classifiers from the classifier set 212 to be the selected classifier based on the static label included in the offline road map data 289.

In some implementations, one or more of the communication module 202, the image capture module 204, the image processing module 206, the client location module 208 and the classifier selector 210 may include code and routines configured to execute one or more blocks of the methods 400, 500 described below with reference to FIGS. 4 and 5 when executed by the processor 225.

Existing computer systems that may attempt to categorize road scene images suffer from numerous deficiencies. For example, such systems may attempt to categorize an entire scene into a sematic road category such as "highway," "coastal," "residential," etc. Other systems may assign an average value to a particular section of a road dynamically. However, both of the systems described earlier in this paragraph are unable to provide a categorization including a direct and definite correlation to driving difficulty for a particular road scene image. These systems may also be data intensive, using raw or JPEG image files, and thereby operate too slowly to process real time images in such a way that the analysis of the real time image may be used to improve performance of a computer subsystem of a vehicle (e.g., GPS, navigation system, etc.) as the vehicle is still at or proximate to the scene included in the real time image. By contrast, as shown below with reference to FIG. 6, the system 200 described herein may provide a driving difficulty category that indicates the driving difficulty of the road scene included in the real time image. The system 200 may be configured to process the real time image and provide the driving difficulty category to a computer subsystem of a vehicle while the vehicle is still at or proximate to the scene included in the real time image. In this way, the system 200 may improve the performance of the compute subsystem of the vehicle (or any other computer system that may benefit from the driving difficulty category provided by the system 200.

The system 200 is configured to work using frontward or rearward facing cameras, which is also not included in prior systems. In this way, the system 200 increases of the ability of computer systems or computer subsystems to use data from a wider variety of camera mounting positions. The system 200 is further configured to provide accurate driving difficulty categorization without the use of any stereo depth cameras which may make it impossible to process the real time images while the vehicle is still at or proximate to the scene included in the real time image.

Example Process Flow

FIG. 3A is a block diagram illustrating a process flow 300 for configuring a classifier selector 210, according to some implementations. The process flow includes the following elements: client location data 301; the road map database 214; the offline road map data 289; the classifier selector 210; the classifier set 212; and the selected classifier 330. The road map database 214, the offline road map data 289, the classifier selector 210, the classifier set 212 and the selected classifier 330 are described above with reference to FIG. 2, and so, these descriptions will not be repeated here. The elements of the process flow 300 will be described below with reference to the elements of FIGS. 1 and 2.

The client location data 301 may include data describing the geographic location of the client device. The client device may include one or more of the first client device 103 and the mobile client device 188. The onboard image system 235 may capture a real time image described by the real time image data 281. The onboard image system 235 may be mounted to the client device 235. Since the client device is at the same or approximately same geographic location as the road scene image depicted by the real time image data 281, the client location data 301 may also describe the location of the road depicted in the real time image. In this way, the client location data 301 may be used to determine information about the road depicted in the real time image which may be used to determine the real time driving difficulty category for the real time image data 281.

The client location data 301 may include one or more of the following: (1) GPS coordinates describing the location of the client device; (2) longitude and latitude coordinates describing the location of the client device; and (3) wireless signal triangulation data describing the location of the client device. For example, the client location data 301 may include GPS data describing the location of the first client device 103 or the mobile client device 188 described above with reference to FIG. 1. The client location data 301 may be used to query the road map database 214.

The offline road map data 289 may be determined based on the client location data 301. For example, the offline road map data 289 may be stored in the road map database 214 and associated with the client location data 301. The road map database 214 may be configured so that searching the road map database 214 using the client location data 301 returns the offline road map data 289. In some implementations, two or more different road map databases 214 may be searched to compile the offline road map database.

The offline road map data 289 may be provided to the classifier selector 210. The classifier selector 210 may select a classifier from the classifier set 212 as the selected classifier 330 based on the offline road map data 289. In some implementations, the classifier selector 210 may determine the selected classifier 330 from the classifier set 212 based on one or more of the static labels and offline road information.

The classifier set 212 may include the following elements: an AB classifier 305; a BCD classifier 310; a CDE classifier 315; a DE classifier 320. The classifier selector 210 may select one of these classifiers as the selected classifier 330 based on the static label included in the offline road map data 289. Accordingly, the selected classifier 330 may include one of the classifiers 305, 310, 315 and 320 included in the classifier set 212.

FIG. 3B is a block diagram illustrating a process flow 399 for selecting a selected classifier 325 from the classifier set 210, according to some implementations. The process flow includes the following elements: the client location data 301; the road map database 214; the offline road map data 289; the classifier selector 210; and the selected classifier 330. The client location data 301, road map database 214, the offline road map data 289, the classifier selector 210 and the selected classifier 330 are described above with reference to FIGS. 2 and 3A, and so, these descriptions will not be repeated here. The elements of the process flow 399 will be described below with reference to the elements of FIGS. 1, 2 and 3A.

The client location data 301 may be used to query the road map database 214. The offline road map data 289 may be determined based on the client location data 301. For example, the offline road map data 289 may be stored in the road map database 214 and associated with the client location data 301. The offline road map data 289 may be provided to the classifier selector 210. The classifier selector 210 may select a classifier from the classifier set 212 as the selected classifier 330 based on the offline road map data 289. In some implementations, the classifier selector 210 may determine the selected classifier 330 from the classifier set 212 based on one or more of the static labels and offline road information included in the offline road map data 289. For example, the offline road information or static label may indicate, among other things, the regulatory speed limit for the road indicated by the client location data 301.

In the example depicted in FIG. 3B, if the regulatory speed limit indicated by the offline road map data 289 is greater than or equal to eighty miles per hour, then the classifier selector 210 selects the AB classifier 305 as the selected classifier 330. The classifier selector 210 selects the BCD classifier 310 as the selected classifier 330 if the regulatory speed limit indicated by the offline road map data 289 is: (1) greater than sixty miles per hour; and (2) less than or equal to eighty miles per hour. The classifier selector 210 selects the CDE classifier 310 as the selected classifier 330 if the regulatory speed limit indicated by the offline road map data 289 is: (1) greater than forty miles per hour; and (2) less than or equal to sixty miles per hour. The classifier selector 210 selects the DE classifier 310 as the selected classifier 330 if the regulatory speed limit indicated by the offline road map data 289 is: (1) greater than twenty miles per hour; and (2) less than or equal to forty miles per hour. The classifier selector 210 selects the E classifier 310 as the selected classifier 330 if the regulatory speed limit indicated by the offline road map data 289 is less than twenty miles per hour. In some implementations, the static label alone may indicate the regulatory speed of the road indicated by the client location data 301. Alternatively, the offline road information may include data describing the regulatory speed limit for the road indicated by the client location data 301, and this may be used to select the selected classifier 330 as described above. In another alternative, a combination of the static label and the offline road information may be used to select the selected classifier 330 as described above. The values indicated herein are intended to serve as an example of how the classifier selector 210 may select the selected classifier, and not intended to be limiting.

Example Methods

Figure 4:
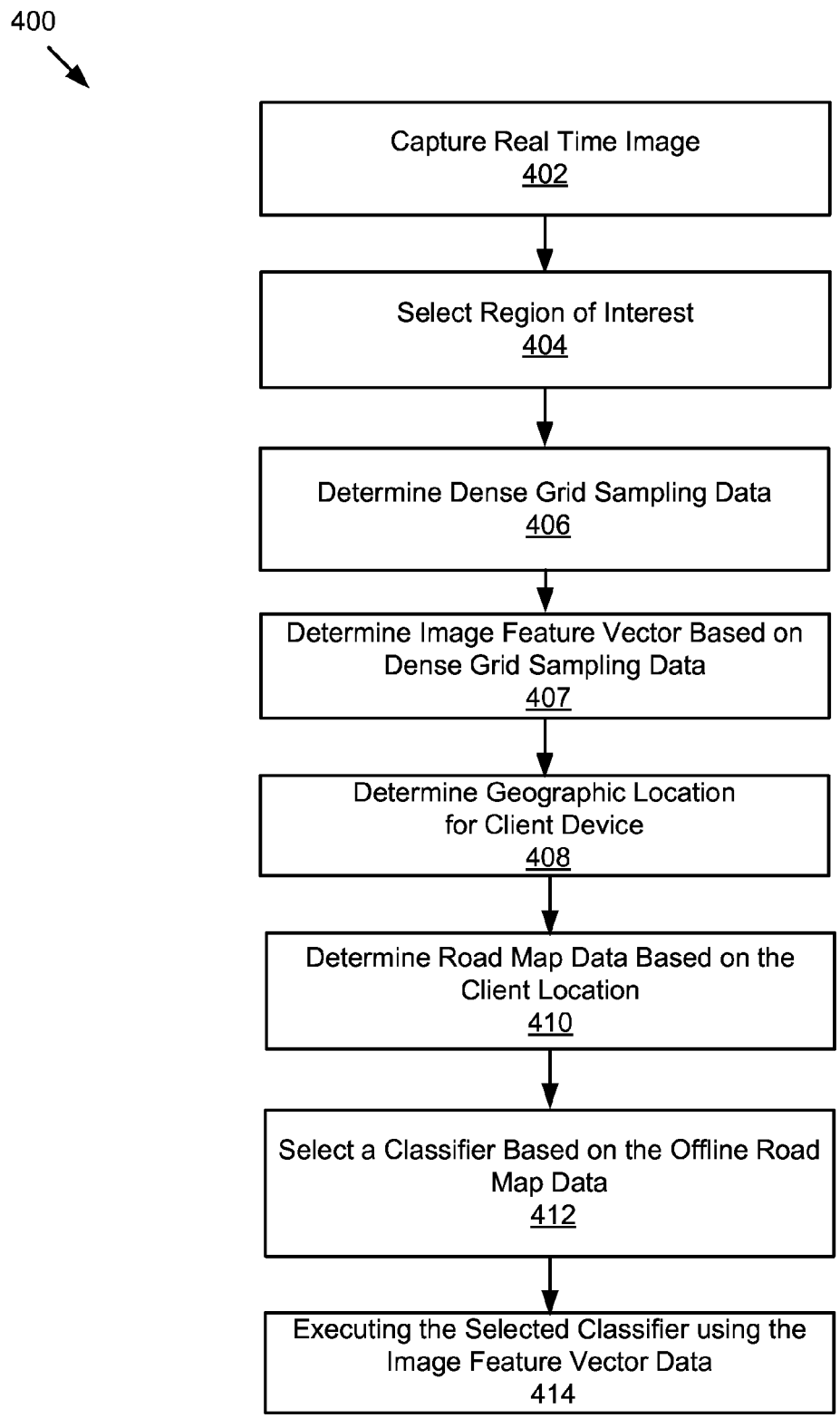
FIG. 4 is a flowchart of an example method for selecting a classifier for a real time image.

FIG. 4 is a flowchart of an example method 400 for selecting a classifier for a real time image, according to some implementations. In some implementations, one or more blocks of the method 400 may be performed by a processor device programmed to perform execution of the one or more blocks. For example, the processor 225 described above with reference to FIG. 2 may be programmed to perform one or more blocks of the method 400. The processor 225 may be programmed by the difficulty application 199. For example, the processor 225 may be programmed by one or more of the modules 202-210 of the difficulty application 199 to perform one or more blocks of the method 400. In some implementations, the processor 225 is a special purpose processor programmed to perform one or more blocks of the method 400.

In some implementations, one or more of the blocks of the method 400 may be excluded or executed in a different order than depicted in FIG. 4. In some implementations, one or more of the blocks may be combined to form a single block.

At block 402 a real time image is captured. At block 404 a region of interest from the real time image is selected. At block 406, dense grid sampling data is determined. At block 407, the image feature vector may be determined based on the dense grid sampling data. At block 408, the geographic location of the client device is determined. At block 410, the road map data associated with the client location is determined. At block 412, a classifier is selected based on the offline road map data. At block 414, the selected classifier is executed using the image feature vector data.

Figure 5:
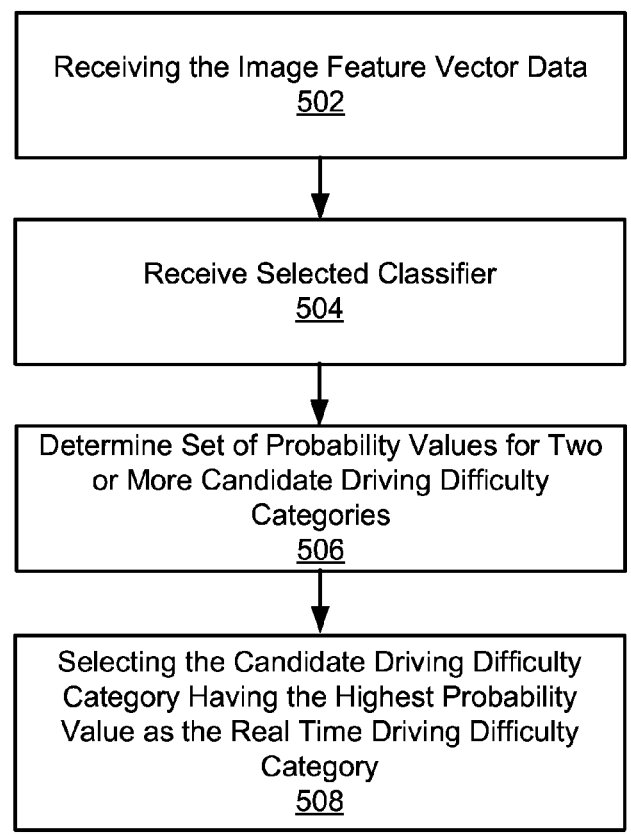
FIG. 5 is a flowchart of an example method for selecting a classifier for a real time image based on one or more probability values.

FIG. 5 is a flowchart of an example method 500 for selecting a classifier for a real time image based on one or more probability values.

In some implementations, one or more blocks of the method 500 may be performed by a processor device programmed to perform execution of the one or more blocks. For example, the processor 225 described above with reference to FIG. 2 may be programmed to perform one or more blocks of the method 500. The processor 225 may be programmed by the difficulty application 199. For example, the processor 225 may be programmed by one or more of the modules 202-210 of the difficulty application 199 to perform one or more blocks of the method 500. In some implementations, the processor 225 is a special purpose processor programmed to perform one or more blocks of the method 500.

At block 502, the image feature vector data may be received. At block 504, the selected classifier may be received. At block 506, the probability data describing the set of probability values for two or more candidate real time driving difficulty categories may be determined. At block 508, the candidate driving difficulty category having the highest probability value among the other candidate real time driving difficulty categories may be selected as the real time driving difficulty category for the road scene depicted in the real time image described by the real time image data.

Example Process Flow for Selecting a Real Time Driving Difficulty Category

Figure 6:
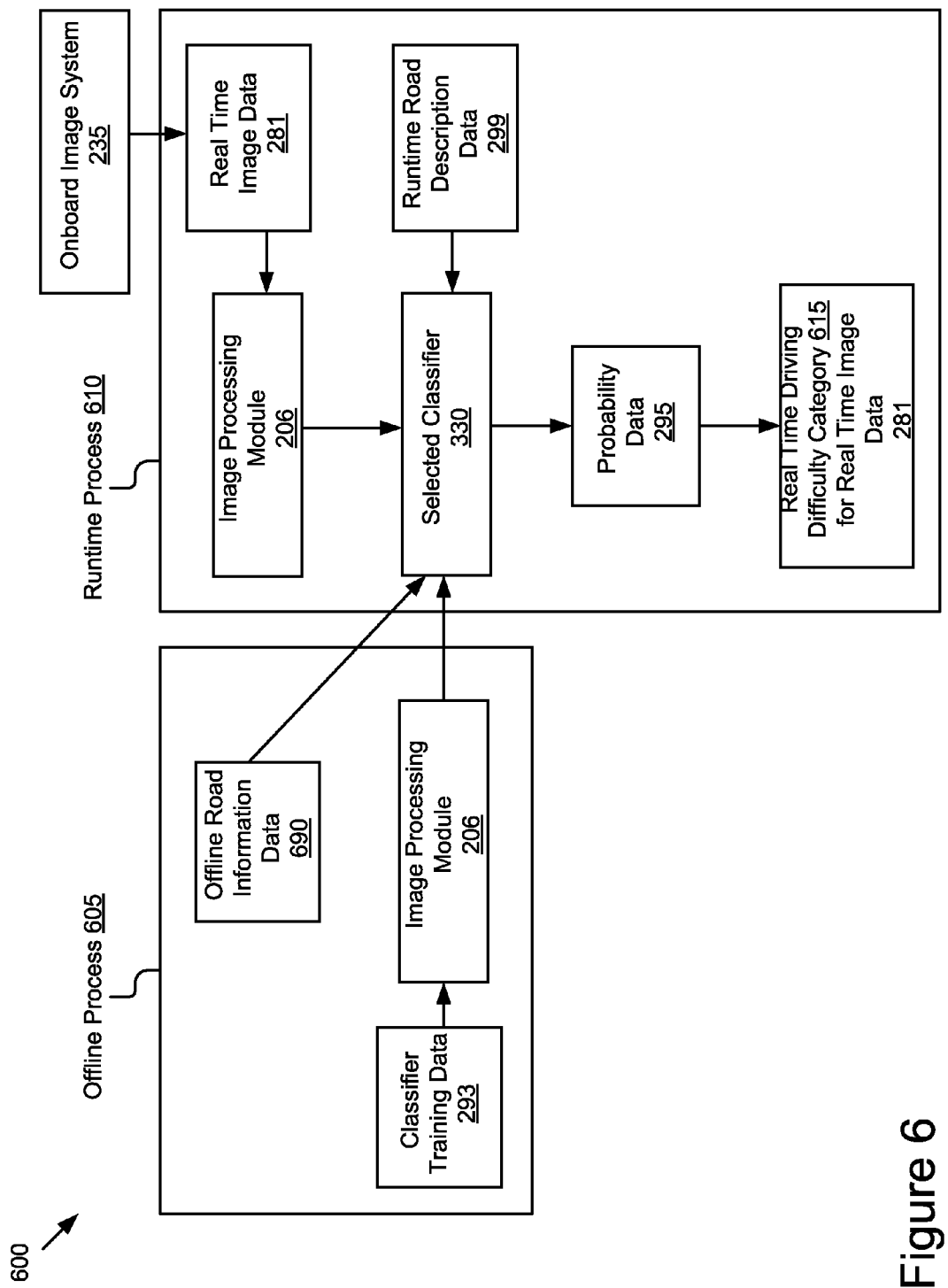
FIG. 6 is a block diagram illustrating a process flow for selecting a real time driving difficulty category for real time image data.

FIG. 6 depicts an example process flow 600 for selecting a real time driving difficulty category for real time image data, according to some implementations. The process flow 600 includes an offline process 605 and a run time process 610.

The offline process 605 may include the classifier training date 293 may be used to train the image processing module 206. The image processing module 206 may extract feature from the images included in the classifier training data 293. The images from which the extracted features originated may have included a static label. Each extracted feature may be associated with the static label from which it originated. Each extracted feature may then be used to train classifiers included in the classifier set 212 which corresponds to its associated static label. For example, features extracted from images having the "B" static label may be used to train the AB classifier 305 and the BCD classifier 310 since these classifiers are related to the B static label. The image processing module 206 may provide the extracted features to the corresponding classifiers included in the classifier set 212. In this way the classifiers included in the classifier set 212 may be trained using the features extracted from the classifier training data 293. One of the classifiers trained using the features extracted from the classifier training data 293 may include the selected classifier 330.

In some implementations, the extracted featured provided to the classifiers included in the classifier set 212 may include one or more feature vectors which may be used to train the classifiers.

The classifiers included in the classifier set 212 may also be provided with the offline road information data 690. For example, the communication module 202 of the difficulty application 199 may provide the offline road information data 690 to one or more of the classifier selector 210 and the selected classifier 330. The offline road information data 690 may include data describing the offline road information. The offline road information may describe descriptive information for one or more roads in a jurisdiction. For example, the offline road information may describe the number of lanes, regulatory speed, and traffic survey information for a given road.

In some implementations, the selected classifier 330 may use the offline road information data 690 to determine the real time driving difficulty category 615 during the runtime process 610.

The runtime process 610 may include, the onboard image system 235 capturing one or more real time images. The one or more real time images may be described by the real time image data 281. The real time image data 281 may be provided to the image processing module 206. The image processing module 206 may determine one or more image feature vectors based on the real time image data 281. The one or more image feature vectors may be described by the image feature vector data 287. The image feature vector data 287 may be provided to the selected classifier 330. The selected classifier may also be provided with the runtime road description data 299. The selected classifier 330 may determine the probability data 295 for one or more candidate real time driving difficulty categories based on one or more of the following: the training using the features from the classifier training data 293; the offline road information data 690; the image feature vector data 287; and the runtime road description data 299. The selected classifier 330 may determine the real time driving difficulty category 615 for the real time image data 281 based on the probability data 295.

In some embodiments, the real time image data 281 may be categorized and assigned to a real time driving difficulty category 615 within 0.001 seconds and 2 minutes of the real time image being captured.

The real time driving difficulty category 615 may include a driving difficulty category that indicates the driving difficulty of the road scene included in the real time image. In some implementations, the real time driving difficulty category 615 may include a driving difficulty category that indicates the driving difficulty of the road scene included in the real time image as viewed from the perspective of the user 125.

The available real time driving difficulty categories may include a category such as "A," "B," "C," "D" or "E." These categories may be described as "candidate real time driving difficulty categories." The selected classifier 330 may assign one of the candidate real time driving difficulty categories to the road scene depicted in the real time image. The assigned category is the real time driving difficulty category 615 for the road scene real time data 281 including the road scene. Roads assigned to the "A" category may be the least difficult for a driver whereas roads assigned to the "E" category may be the most difficult for drivers. Accordingly, a category "E" road may be more difficult to drive than a category "D" road, a category "C" road, a category "B" road and a category "A" road. A category "D" road may be less difficult to drive than a category "E" road, but more difficult to drive than a category "C" road, a category "B" road and a category "A" road. A category "C" road may be less difficult to drive than a category "E" road and a category "D" road, but more difficult to drive than a category "B" road and a category "A" road. A category "B" road may be less difficult to drive than a category "E" road, a category "D" road and a category "C" road, but more difficult to drive than a category "A" road. A category "A" road may be less difficult to drive than a category "E" road, a category "D" road, a category "C" road, a category "B" road and a category "A" road.

Although the candidate real time driving difficulty categories ("A," "B," "C," "D" and "E") may have a similar appearance to the static labels described above with reference to FIG. 2 (also "A," "B," "C," "D" and "E"), the candidate real time driving difficulty categories differ in quality from the static label since they may be assigned to a road scene based on real time data such as the real time image data 281 and the runtime road description data 299 that has been captured and analyzed under dynamic conditions. The real time data may also be captured from the perspective of the user 125, thereby resulting in a real time driving difficulty category 615 that is more realistic when considered from the perspective of the driver. The real time data may be captured and analyzed at the actual road scene being categorized. For example, the real time data may be analyzed within 0.001 seconds and 2 minutes of being captured. As a result, the real time driving difficulty category 615 is based on fresher and more reliable data that the static labels. The real time driving difficulty category 615 may also take into account offline data such as the static label since the static label is used as a prior when determining the selected category 330. The real time driving difficulty category 615 may also take into account other offline data such as the offline road information data 690.

In some implementations, the real time driving difficulty category 615 may be stored on a memory such as memory 227 described above with reference to FIG. 2. The real time driving difficulty category 615 may be used as an input to other systems to improve their functionality and ability to accurately determine the driving difficulty of roads and road segments. These systems which may be improved using the real time driving difficulty category 615 may include, for example, a driver assistance system, a navigation system, an autonomous or semi-autonomous vehicle or any other processor-based computing system which may include inputs similar to the real time driving difficulty category 615. In this way, the real time driving difficulty category 615 may improve the performance of such computer systems by providing them with real time data describing the driving difficulty of a road scene while a vehicle or some other client is still at or proximate to the scene included in the road scene. Computer systems that do not include the real time driving difficulty category 615 may not be able to determine the driving difficulty or road scenes included in a real time image, much less determine the driving difficulty of a road scene while a vehicle or other client which captured the real time image is still at or proximate to the road scene included in the real time image.

The implementations of the specification may also relate to an apparatus for performing the operations described herein. This apparatus may be specially constructed for the required purposes, or it may include a special-purpose computer selectively activated or reconfigured by a computer program stored in the computer. Such a computer program may be stored in a non-transitory computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification may take the form of some entirely hardware implementations, some entirely software implementations, or some implementations containing both hardware and software elements. In some implementations, the specification is implemented in software, which includes, but is not limited to, firmware, resident software, microcode, etc.

Furthermore, the description may take the form of a computer program product accessible from a computer-usable or computer-readable medium providing program code for use by or in connection with a computer or any instruction execution system. For the purposes of this description, a computer-usable or computer-readable medium may be any apparatus that may contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure may be implemented as software, hardware, firmware, or any combination of the three. Also, wherever a component, an example of which is a module, of the specification is implemented as software, the component may be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A method comprising:
receiving real time image data describing a real time image depicting a road scene;
determining region of interest data describing a version of the real time image configured to remove redundant features from the real time image;
determining dense grid sampling data describing one or more features included in the version of the real time image described by the region of interest data;
determining image feature vector data based on the one or more features included in the dense grid sampling data, the image feature vector data describing an image feature vector for the version of the real time image described by the region of interest data;
receiving client location data describing a geographic location of a client device associated with the road scene included in the real time image;
determining offline road map data for the road scene based on the geographic location of the client device, the offline road map data describing (1) a static label for a road included in the road scene and (2) offline road information describing a regulatory speed limit for the road included in the road scene;
selecting, based on the static label, a classifier for analyzing the image feature vector; and
executing, by a processor, the selected classifier to determine a real time driving difficulty category describing the difficulty for a user of the client device to drive in the road scene depicted in the real time image, wherein the real time driving difficulty category is determined based on the image feature vector, offline road information and runtime road description data describing the real time driving conditions of the road scene depicted in the real time image.

2. A method comprising:
determining dense grid sampling data describing one or more features included in a version of a real time image of a road scene which is configured to remove one or more redundant features from the real time image;
determining image feature vector data based on one or more features described by the dense grid sampling data, the image feature vector data describing an image feature vector for the version of the real time image which is configured to remove the one or more redundant features from the real time image;
determining offline road map data for the road scene based on a geographic location of a client device associated with the road scene included in the real time image, the offline road map data describing (1) a static label for a road included in the road scene and (2) offline road information describing a regulatory speed limit for the road included in the road scene;
selecting, based on the static label, a classifier for analyzing the image feature vector; and
executing, by a processor, the selected classifier to determine a real time driving difficulty category describing the difficulty for a user of the client device to drive in the road scene depicted in the real time image, wherein the real time driving difficulty category is determined based on the image feature vector and the offline road information.

3. The method of claim 2, wherein the classifier is executed in real time relative to when the real time image depicting the road scene is captured.

4. The method of claim 2, wherein the real time driving difficulty category is determined based in part on runtime road description data describing the real time driving conditions of the road scene depicted in the real time image.

5. The method of claim 2, wherein the client device is a mobile device.

6. The method of claim 2, wherein the real time image is captured by an onboard image system.

7. The method of claim 6, wherein the client device is a vehicle and the onboard image system is mounted on the vehicle to be frontward facing.

8. The method of claim 6, wherein the client device is a vehicle and the onboard image system is mounted on the vehicle to be rearward facing.

9. The method of claim 2, wherein the offline road map data is determined during an offline process.

10. The method of claim 2, wherein the real time image is captured during a runtime process.

11. A non-transitory computer-readable medium having computer instructions stored thereon that are executable by a processing device to perform or control performance of operations comprising:
determining dense grid sampling data describing one or more features included in a version of a real time image of a road scene which is configured to remove one or more redundant features from the real time image;
determining image feature vector data based on one or more features described by the dense grid sampling data, the image feature vector data describing an image feature vector for flail the version of the real time image which is configured to remove the one or more redundant features from the real time image;
determining offline road map data for the road scene based on a geographic location of a client device associated with the road scene included in the real time image, the offline road map data describing (1) a static label for a road included in the road scene and (2) offline road information describing a regulatory speed limit for the road included in the road scene;
selecting, based on the static label, a classifier analyzing the image feature vector; and
executing, by a processor, the selected classifier to determine a real time driving difficulty category describing the difficulty for a user of the client device to drive in the road scene depicted in the real time image, wherein the real time driving difficulty category is determined based on the image feature vector and the offline road information.

12. The non-transitory computer-readable medium of claim 11, wherein the classifier is executed in real time relative to when the real time image depicting the road scene is captured.

13. The non-transitory computer-readable medium of claim 11, wherein the client device is a robot.

14. The non-transitory computer-readable medium of claim 11, wherein the client device is an IoT device.

15. The non-transitory computer-readable medium of claim 11, wherein the real time image is captured by an onboard image system.

16. The non-transitory computer-readable medium of claim 15, wherein the client device is a vehicle and the onboard image system is mounted on the vehicle to be frontward facing.

17. The non-transitory computer-readable medium of claim 15, wherein the client device is a vehicle and the onboard image system is mounted on the vehicle to be rearward facing.

18. The non-transitory computer-readable medium of claim 15 or 17, wherein: the offline road map data is determined during an offline process; and the real time image is captured during a runtime process.

\* \* \* \* \*